United States Patent
Tezuka et al.

(10) Patent No.: US 6,891,460 B2
(45) Date of Patent: May 10, 2005

(54) ROTOR TRANSFORMER POSITIONING MECHANISM AND OPERATING METHOD THEREFOR

(75) Inventors: Tsuneo Tezuka, Tokyo (JP); Genta Yoshii, Tokyo (JP)

(73) Assignee: Minebea Co., Ltd., Nagano-Ken (JP)

( * ) Notice: Subject to any disclaimer, the term of this patent is extended or adjusted under 35 U.S.C. 154(b) by 168 days.

(21) Appl. No.: 10/403,059

(22) Filed: Apr. 1, 2003

(65) Prior Publication Data

US 2004/0046627 A1 Mar. 11, 2004

(30) Foreign Application Priority Data

Apr. 2, 2002 (JP) ........................................ 2002-099827

(51) Int. Cl.$^7$ ............................................. H01F 21/06
(52) U.S. Cl. ........................ 336/130; 336/131; 336/132; 336/134; 336/115; 318/605
(58) Field of Search ................. 336/120, 115, 336/130–135; 318/605, 606

(56) References Cited

U.S. PATENT DOCUMENTS

| | | | | |
|---|---|---|---|---|
| 3,611,230 A | | 10/1971 | Maake ........................ 336/120 |
| 3,717,029 A | * | 2/1973 | Tveter ......................... 74/136 |
| 3,882,436 A | | 5/1975 | Chaas .......................... 336/83 |
| 4,345,230 A | * | 8/1982 | Chass ......................... 336/135 |
| 5,239,288 A | | 8/1993 | Tsals .......................... 336/120 |
| 5,701,114 A | | 12/1997 | Chass ......................... 336/115 |
| 5,705,872 A | * | 1/1998 | Loge .......................... 310/161 |
| 6,038,761 A | * | 3/2000 | Meiler et al. ................. 29/605 |
| 6,118,201 A | * | 9/2000 | Dulin et al. ................. 310/161 |
| 2003/0102949 A1 | * | 6/2003 | Matsuura et al. ........... 336/198 |

* cited by examiner

Primary Examiner—Anh Mai
(74) Attorney, Agent, or Firm—Adduci, Mastriani & Schaumberg, LLP

(57) ABSTRACT

A rotor transformer positioning mechanism permitting automatic positioning of a rotor transformer, having a first winding, relative to a rotor stack, having a second winding, mounted on a common rotary shaft to thereby permit a crossover having a predetermined length to be installed between the first and second windings includes a crossover positioning cutout disposed in a first flange of the rotor transformer. In an exemplary case, the rotor transformer includes the first flange and a second flange disposed on opposite ends of the first coil, and the second flange is proximate to the crossover. A method of assembling a rotating machine using the rotor transformer positioning mechanism is also described.

20 Claims, 4 Drawing Sheets

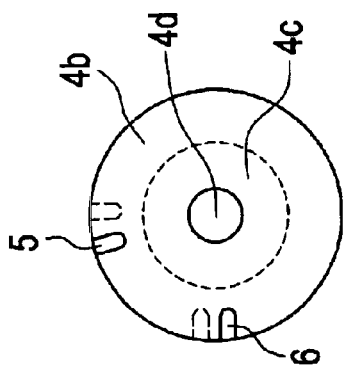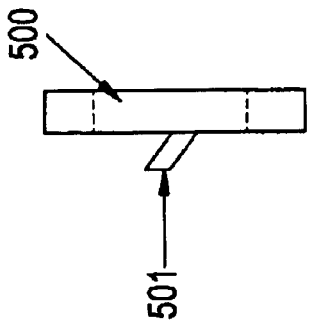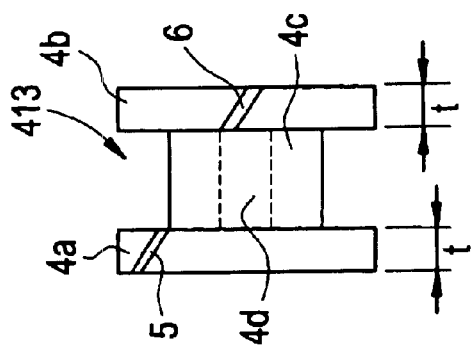

ROTOR TRANSFORMER POSITIONING MECHANISM AND OPERATING METHOD THEREFOR

BACKGROUND OF THE INVENTION

The present invention relates generally to rotary transformers. More specifically, the present invention relates to mechanisms for positioning the rotor of a rotary transformer relative to a rotor stack mounted on a common rotatable shaft. A corresponding operating method is also disclosed.

The present application is based on Japanese Patent Application No. 2002-099827, which application is incorporated in its entirety by reference.

Rotary transformers are conventional devices that have been employed for routing input and/or output signals in commonly known devices such as resolvers, synchros, etc. In the discussion that follows, the application of rotary transformers to resolvers will be described. It will be appreciated that a resolver is basically a rotary, electromechanical device used to perform trigonometric computations by varying the magnetic couplings between its primary and secondary windings. One example of such a device is disclosed in Japanese Unexamined Patent Application Publication No. S63-318725, which is also incorporated herein by reference.

FIG. 4 illustrates the employment of a rotary transformer in conjunction with a resolver. More specifically, FIG. 4 is a partial cross-sectional view of a conventional resolver employing a rotary transformer, in which a circular case 401 encloses a resolver 402 and a rotary transformer 403. The resolver 402 includes a resolver stator 405, which has a resolver stator winding 404; the rotary transformer 403 includes a stator transformer 407, which has a stator transformer winding 406. Both the resolver stator 405 and the stator transformer 407 are disposed adjacent to the case 401. A shield plate 9a that prevents leakage of magnetic flux from the stator transformer 407 of the rotary transformer 403 is disposed between the resolver stator 405 and the stator transformer 407. The rotary transformer 403 provides current to the resolver 402 and permits signal input and output.

In addition, the resolver includes a resolver rotor 411, which has a resolver rotor winding 410, while the rotary transformer 403 includes a rotor transformer 413, which has a rotor transformer winding 412. Both the resolver rotor 411 and the rotor transformer 413 are coupled to a rotary shaft (not shown), which shaft permits both the resolver rotor and the rotor transformer to rotate freely within case 401.

It will be noted that the resolver stator 405, stator transformer 407, resolver rotor 411 and rotor transformer 413 are each fabricated from stacks of cut, solid steel bars. It will also be noted from FIG. 4 that the stator transformer 407 is fixed with respect to the side of the case 401 by a retaining ring 460, i.e., a "C" ring. Finally, it should be noted that the resolver rotor winding 410 is connected from the rotary transformer winding 412 via a crossover (not shown in FIG. 4).

It will be appreciated that the output of the resolver rotor winding 410 is determined by the number of magnetic poles, the phase of the drive voltage, etc. When the resolver rotor 411 is secured to the rotary shaft (not shown in FIG. 4), the output of the resolver rotor winding 410 is uniquely determined with respect to the rotary shaft. On the other hand, the rotor transformer winding 412 of the rotary transformer 403 is connected to the resolver rotor winding 410 via a pair of crossover leads (hereinafter simply crossover). While the length of the crossover is constant, if the position of the rotor transformer winding 412 on the rotary shaft is not taken into account, the distance between the rotor transformer winding 412 and the resolver rotor winding 410 will vary. Thus, the crossover may come into contact with the stator transformer 407, the resolver stator 405, etc., resulting in a short circuit.

In order to prevent this type of problem from occurring, it is desirable that the output leads of the rotor transformer winding 412 and the resolver rotor winding 410 be adjacent to one another. However, since the rotor of the rotary transformer and the rotor of the resolver are normally manufactured separately, the rotor transformer winding 412 and resolver rotor winding 410 are also independently wound. Therefore, in order to make the output leads of the rotor transformer winding 412 and the resolver rotor winding 410 (collectively the crossover) mutually adjacent during assembly, they must be positioned visually. It will be appreciated that this is an obstacle to the mass production, i.e., automation of the manufacturing process, of resolvers, etc.

What is needed is a positioning mechanism that permits automation of the winding and assembly of multiple electrically coupled rotor transformers on a common rotary shaft. It would be particularly desirable if the positioning mechanism were an integral part of one of the rotor transformers, e.g., the rotor of a rotary transformer. What is also needed is a mechanism for routing the crossover that does not adversely influence the flux profile of the rotary transformer.

SUMMARY OF THE INVENTION

Based on the above and foregoing, it can be appreciated that there presently exists a need in the art for a positioning mechanism that overcomes the above-described deficiencies. The present invention was motivated by a desire to overcome the drawbacks and shortcomings of the presently available technology, and thereby fulfill this need in the art.

In one aspect, the present invention provides a rotor transformer positioning mechanism permitting automatic positioning of a rotor transformer, having a first winding, relative to a rotor stack, having a second winding, mounted on a common rotary shaft to thereby permit a crossover having a predetermined length to be installed between the first and second windings. The rotor positioning mechanism advantageously includes a crossover positioning cutout disposed in a first flange of the rotor transformer. In an exemplary case, the rotor transformer includes the first flange and a second flange disposed on opposite ends of the first coil, and the second flange is proximate to the crossover. If desired, a crossover cutout can be disposed in the second flange. Preferably, the crossover positioning cutout is inclined with respect to a line parallel to the rotation axis of the rotor transformer. When the crossover cutout is disposed in the second flange, the crossover positioning cutout and the crossover cutout can each be inclined with respect to a line parallel to the rotation axis of the rotor transformer. To further guard against magnetic flux variations in the rotor transformer, the crossover positioning cutout and the crossover cutout can be angularly displaced about the circumferences of the first and second flanges, respectively.

According to another aspect, the present invention provides a rotating machine, which includes a rotary transformer including a rotor transformer having a spool on which a first coil is wound and a rotor stack including a second coil having power leads energized by the first coil via a crossover. In an exemplary case, the rotor transformer further includes first and second flanges connected to respective ends of the spool, where the rotor transformer and the rotor stack are coupled to a common rotating shaft, the first flange is disposed proximate to the rotor stack, the first flange includes a crossover cutout located in the periphery of the first flange, which receives the crossover, and the second flange includes a crossover positioning cutout located in the periphery of the second flange, which arrangement permits, when the crossover positioning cutout is rotated to a first position relative to the power leads of the second coil, the crossover cutout to be positioned at a second predetermined position permitting installation of the crossover.

In a further aspect, the present invention provides a method for assembling a rotating machine including a rotary transformer employing a rotor transformer having a spool on which a first coil is wound, and a rotor stack equipped with a second coil having power leads energized by the first coil via a crossover, the rotor transformer having first and second flanges connected to respective ends of the spool, the rotor transformer and the rotor stack being coupled to a common rotating shaft, the first flange being disposed proximate to the rotor stack, wherein the first flange includes a crossover cutout located in the periphery of the first flange, which receives the crossover, and the second flange includes a crossover positioning cutout located in the periphery of the second flange. The method includes steps of providing a jig including a pawl, engaging the jig with the rotor transformer at the crossover positioning cutout, rotating the jig to a predetermined position to thereby rotate the crossover positioning cutout to a first position relative to the power leads of the second coil, the first position automatically positioning the crossover cutout to a second position relative to the power leads of the second coil, and installing the crossover. If desired, the method further includes the step of attaching the rotor transformer to the rotating shaft. In an exemplary case, the attaching step can be performed after the installing step.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 2(a), 2(b), and 2(c) illustrate a front view, a right side surface view, and a partial enlarged view of the flange of a transformer spool, respectively, employed in the rotary transformer illustrated in FIG. 1, while FIG. 2(d) illustrates a jig that mates with the rotor transformer illustrated in FIG. 1;

DETAILED DESCRIPTION OF THE PREFERRED EMBODIMENTS

Figure 1:
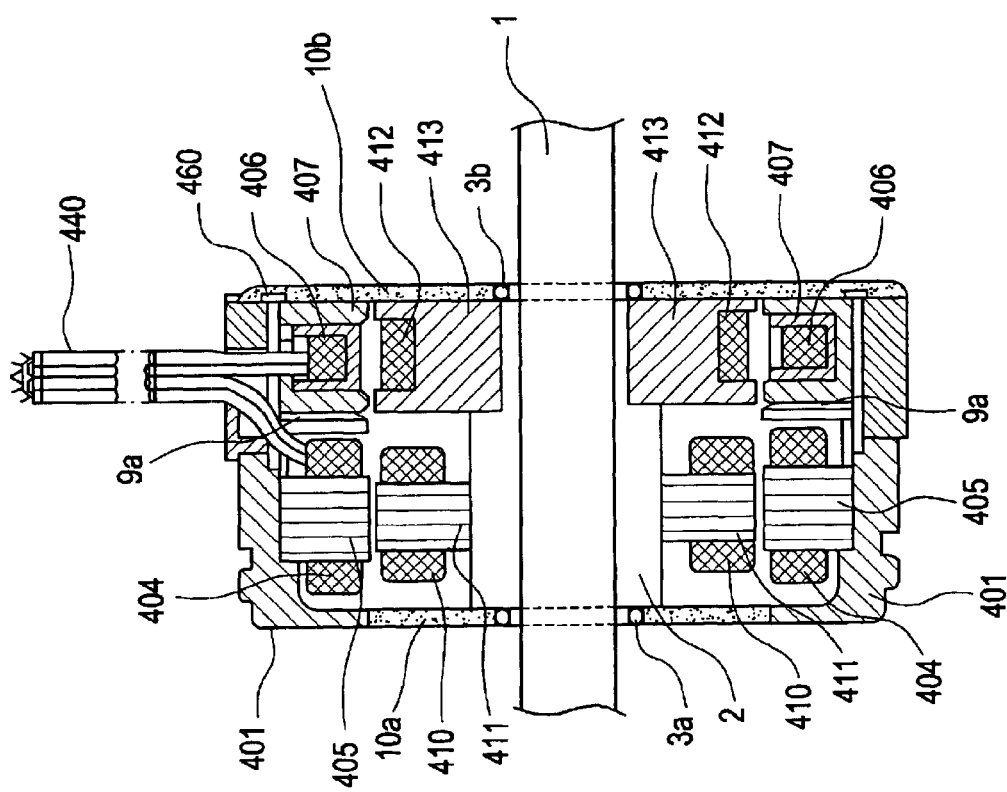
FIG. 1 is a sectional view of an exemplary embodiment of a resolver powered by the rotary transformer according to the present invention.
Figure 4:
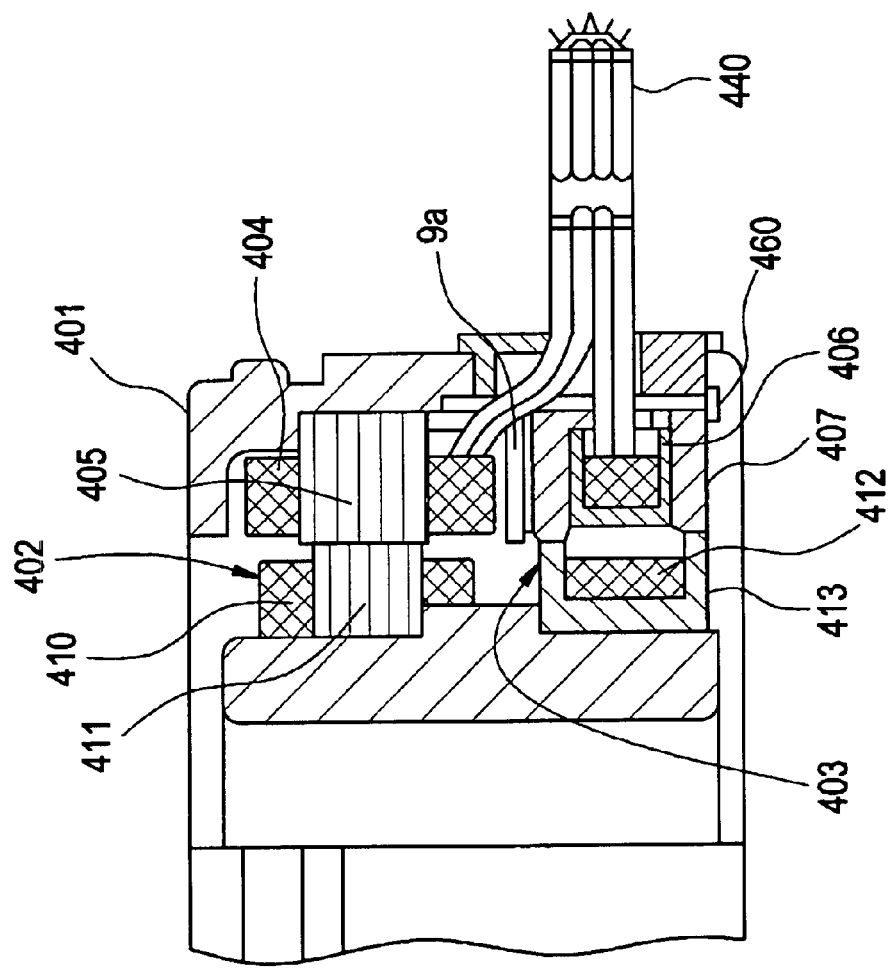
FIG. 4 is a partial cross sectional view of a conventional rotary transformer.

An exemplary embodiment of the positioning mechanism for a rotor transformer according to the present invention is illustrated in FIG. 1. It will be appreciated that many of the elements depicted in FIG. 1 were previously described in connection with FIG. 4. In the interest of brevity, an explanation of like numbered elements will not be provided with respect to FIG. 1.

Before discussing the exemplary embodiment of the present invention, it should be noted that the discussion will be limited to a resolver, e.g., a resolver incorporating a rotary transformer. It will be appreciated that the present invention is not so limited. The present invention is also applicable to such devices as brushless synchros, brushless resolvers, etc. that use rotor stacks. In addition, it should also be noted that the term rotor stack as used herein refer to a rotor, e.g., a resolver rotor.

Referring to FIG. 1, the rotor transformer 413 and resolver rotor 411 are secured to a rotary shaft 1 by a shaft holder 2, as discussed in greater detail below. The rotary shaft 1 is rotatably supported by the covers 10a, 10b via bearings 3a, 3b, respectively. The rotor transformer winding 412 and resolver rotor winding 410, which are respectively wound around the rotor transformer 413 and the resolver rotor 411, are connected by a crossover (not shown in FIG. 1).

FIGS. 2(a), 2(b), and 2(c) collectively illustrate an exemplary embodiment of the rotor transformer 413 according to the present invention. More specifically, FIG. 2(a) is a front view, FIG. 2(b) is a right side surface view, and FIG. 2(c) is an enlarged view of the positioning cutout 6 in lower flange 4b, which is discussed below. The rotor transformer 413 includes upper and lower flanges 4a, 4b mechanically coupled by a spool 4c. It will be appreciated from FIG. 2(c) that positioning cutout 6 advantageously can be formed at an inclination in the lower flange 4b. In addition, a crossover cutout 5 for drawing out the crossover that connects the rotor transformer winding 412 and the resolver rotor winding 410 is formed at an inclination in upper flange 4a. Preferably, the rotor transformer winding 412 (not shown in FIG. 2(a)) is wound on the spool 4c that is sandwiched between the upper and lower flanges 4a and 4b. The crossover 7 (see FIG. 3) is drawn out through the crossover cutout 5, and it is connected to the resolver rotor winding 410. It will be appreciated that upper and lower terms are relative rather than absolute terms.

The positional relationship of the positioning cutout 6 formed in the lower flange 4b with respect to the crossover cutout 5 formed in upper flange 4a is preferably determined as follows. More specifically, when the positioning cutout 6 is arranged so that the rotor transformer 413 and the resolver rotor 411 are moved to the prescribed position with respect to crossover cutout 5, as discussed below, the outlet leads of the rotor transformer winding 412 and the resolver rotor winding 410 are in a predetermined position relative to one another. Thus, by positioning the rotor transformer 413 so that the positioning cutout 6 comes to the prescribed position with respect to the resolver rotor 411, the outlet leads of the resolver rotor winding 410, the rotor transformer winding 412, and the crossover cutout 5 always correspond, such that the position of the crossover 7, which advantageously connects the rotor transformer winding 412 and the resolver rotor winding 410, is fixed.

It will be appreciated from examination of FIGS. 2(a) through 2(c) that the crossover cutout 5 and the positioning cutout 6, which are respectively formed on the upper and lower flanges 4a and 4b, are inclined with respect to the rotation axis of the rotor transformer 413, i.e., the sides of the cutouts 5 and 6 intersect a line parallel to the rotation axis of the rotor transformer. The degree of inclination for each of the cutouts is determined as follows. As shown in FIG. 2(c), the positioning cutout 6 advantageously is inclined so that there are no adverse effects when the magnetic flux ÖR that is generated by the rotor transformer 413 leaks from the positioning cutout 6 to the resolver rotor winding 410. That is, the magnetic flux ÖR that is generated on the spool 4c side passes through flange section 4b1 or flange section 4b2 of the lower flange 4b. The same is true for the crossover cutout 5 formed in upper flange 4a.

In addition, the positioning cutout 6 and the crossover cutout 5 through which the crossover 7 is drawn are formed at positions that are mutually different with respect to the rotary shaft direction. More specifically, the upper and lower flanges 4a, 4b of the rotor transformer 413 of the rotary transformer 403 are configured such that these flanges are disposed opposite upper and lower flanges associated with the stator transformer 407. Thus, it will be appreciated that it is preferable that the gap between the respective upper and lower flanges be maintained relatively constant. However, as explained above, a crossover cutout 5 that draws out the crossover 7 and a positioning cutout 6 are respectively formed at the upper and lower flanges 4a, 4b, and the gap between the rotor transformer 413 and the stator transformer 407 becomes wider in the vicinity of these cutouts. It will be appreciated that some of the problems associated with stator contact by the crossover could be alleviated by routing the crossover out of a throughhole or a vertical cutout in the rotor transformer 413. However, this solution would produce localized magnetic flux abnormalities that would degrade the operation of the resolver 402. The problem would be exacerbated if both the crossover cutout 5 and the positioning cutout 6 were disposed in a plane defined by the cutouts and the rotation axis of the rotary transformer 403. In order to avoid this adverse effect on the magnetic flux distribution, the cutouts are both inclined with respect to the rotation axis and they are angularly displaced relative to one another By preventing the gap differences from occurring simultaneously at both the upper and lower flanges 4a and 4b, and by inclining each of the cutouts, the change in the gap due to rotation is gradually reduced. It will be appreciated that the effects on the transmission characteristics of the rotary transformer 403 are slight.

Figure 3:
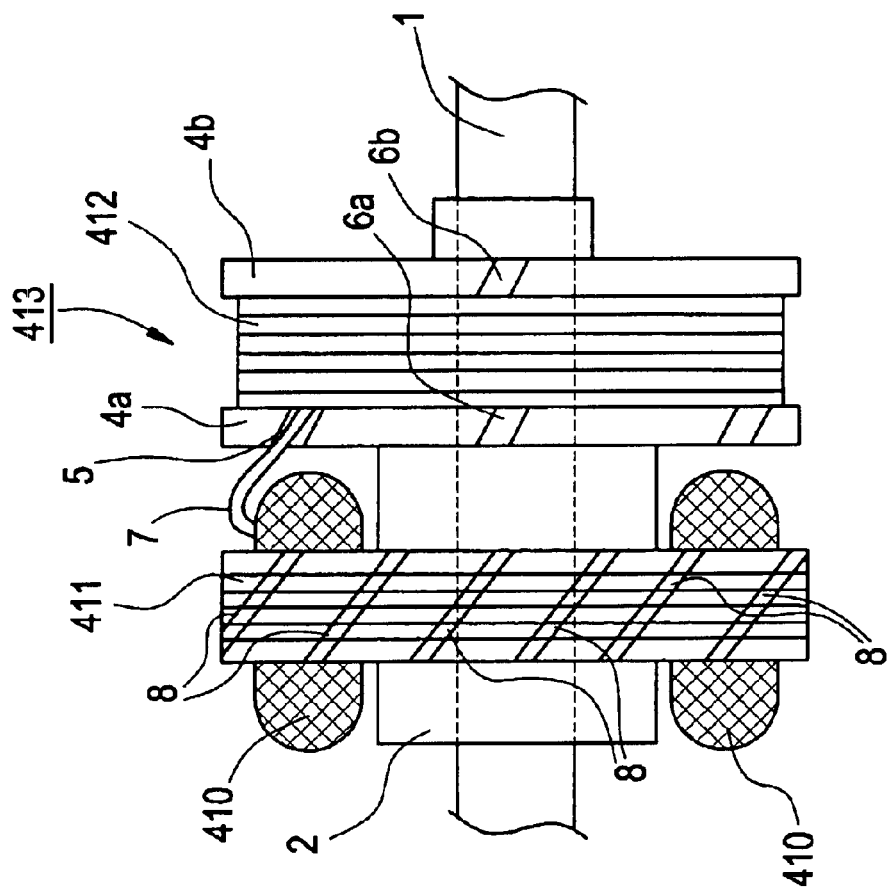
FIG. 3 illustrates the engagement of the rotary transformer and the resolver rotor with a shaft holder.

Referring now to FIGS. 2(a)–2(d), as well as FIG. 3, the operation of the rotor transformer positioning mechanism according to the present invention will now be described. It will be noted that FIG. 3 illustrates the mounting of the rotor transformer 413 and the resolver rotor 411 on the shaft 1, i.e., each of the elements 411 and 413 engage with a shaft holder 2 which, in turn, engages with the shaft 1. Preferably, when the rotor transformer 413 engages with the shaft holder 2, the rotor transformer 413 advantageously can be aligned with a prescribed position of the resolver rotor 411 by means of a positioning jig 500 (See FIG. 2(d).), which can be employed to align the rotor transformer 413 to a prescribed position with respect to the resolver rotor 411.

More specifically, the resolver rotor 411 is fixedly engaged with the shaft holder 2. The rotor transformer 413, which includes the positioning cutout 6 and the crossover cutout 5, which are shifted by 90 degrees, i.e., which are positioned 90° apart, are maneuvered into a predetermined position relative to the resolver rotor 411. From FIG. 3, it will be appreciated that, when the outlet of the resolver rotor winding 410, which is wound around the resolver rotor 411, and the crossover cutout 5 are arranged at the top and at corresponding positions relative to one another, e.g., adjacent to one another, the positioning cutout 6 comes to a position in the front of the rotary shaft 1. Therefore, aligning the position of the rotor transformer 413 by means of a positioning jig 500, so that the outlet of the resolver rotor winding 410 is in a predetermined position and so that the positioning cutout 6 comes to the front of the rotary shaft 1, results in the outlet leads of the resolver rotor winding 410 always corresponding to the crossover cutout 5, permitting the crossover 7, which connects the rotor transformer winding 412 and the resolver rotor winding 410, to be an optimum length when installed.

Still referring to FIG. 3, it will be noted that the crossover positioning cutout 6 advantageously can be provided in both the upper and lower flanges 4a, 4b. (See cutouts 6a and 6b in FIG. 3.) Moreover, the crossover cutout 5 can be formed in both flanges as well. This permits the rotor transformer 413 to be employed in either of the two possible orientations, which advantageously can eliminate steps to control the orientation of the rotor transformer.

From FIG. 2(d), it will be appreciated that the positioning jig 500 advantageously includes a pawl 501, which is inclined at the same angle as the inclination of the positioning cutout 6, in an exemplary case. The rotor transformer 413 is inserted onto the shaft holder 2, and then the pawl 501 of the jig 500 is placed at, or proximate to, the surface of lower flange 4b of the rotor transformer 413, and the rotor transformer 413 rotates. It will be appreciated that the positioning jig 500 can be rotated until the pawl 501 engages the positioning cutout 6 of the rotor transformer 413 and, then, continues to rotate until the positioning cutout 6 is in a predetermined position relative to the resolver rotor 411, e.g., the position illustrated in FIG. 3. Once in position, the rotor transformer 413 is secured to maintain the shaft holder 2 at a position where the pawl 501 of the positioning jig 500 has matched up with the positioning cutout 6. Then, the rotor transformer winding 412 is drawn out from the crossover cutout 5 and it is connected with the resolver rotor winding 410 that is wound around the resolver rotor 411. The shaft holder 2 and the rotary shaft 1 are then secured by any well known attachment method or device, e.g., set screws, pins, lock nuts, etc. It will be appreciated that the sequence described above is exemplary, not mandatory.

As shown in FIG. 3, in the exemplary case where the resolver rotor 411 is formed by a skewed magnetic pole that has notches 8 that are inclined with respect to the rotary shaft 1, the inclination of the positioning cutout 6 advantageously may be the same as the inclination of the notches of the skewed magnetic pole. It will be noted that in the case described immediately above, the positioning jig 500 can be shared with the jig that detects the skew status of the resolver rotor 411. Note that, in this case as well, the inclination angle is of magnitude sufficient to prevent magnetic flux leakage, as described above.

It will be appreciated that the rotor transformer positioning mechanism described above, by positioning a rotor transformer and rotor stack, in which windings are wound around the respective spools, relative to one another on the same rotary shaft and by the crossover positioning cutout being formed at the flange provided at both ends of the spool of the rotor transformer, permits automation of the positioning operation of the rotor transformer with respect to the rotor stack. Moreover, the rotor transformer positioning mechanism according to the present invention, by virtue of the inclination of the positioning cutout of the rotor transformer with respect to the rotation axis, eliminates or mitigates magnetic flux variations generated by the rotor transformer.

It will also be appreciated that the rotor transformer positioning mechanism according to the present invention, by including both a positioning cutout and a crossover cutout in respective first and second flanges associated with the rotor transformer, which cutouts are separated from one another by predetermined angle determined with respect to the rotation axis of the rotor transformer, eliminates or mitigates the magnetic flux variations associated with the positioning and crossover cutouts. In short, the rotor transformer configuration discussed immediately above makes it possible to reduce the effects on the rotary transformer characteristics resulting from these cutouts. Furthermore, the rotor transformer positioning mechanism, by virtue of the inclination of the positioning cutout being the same as the inclination of the notches formed on the rotor stack with respect to the rotation axis, permits a single positioning jig to be employed in the manufacturing process.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A rotor transformer positioning mechanism permitting automatic positioning of a rotor transformer, having a first winding, relative to a rotor stack, having a second winding, mounted on a common rotary shaft to thereby permit a crossover having a predetermined length to be installed between the first and second windings, the rotor positioning mechanism comprising:

a crossover positioning cutout disposed in a first flange of the rotor transformer, wherein:

the rotor transformer includes the first flange and a second flange disposed on opposite ends of the first coil, and the second flange is proximate to the crossover.

2. The rotor transformer positioning mechanism as recited in claim 1, further comprising a crossover cutout disposed in the second flange.

3. The rotor transformer positioning mechanism as recited in claim 1, wherein the crossover positioning cutout is inclined with respect to a line parallel to the rotation axis of the rotor transformer.

4. The rotor transformer positioning mechanism as recited in claim 1, further comprising a crossover cutout disposed in the second flange, wherein the crossover positioning cutout and the crossover cutout are each inclined with respect to a line parallel to the rotation axis of the rotor transformer.

5. The rotor transformer positioning mechanism as recited in claim 4, wherein the crossover positioning cutout and the crossover cutout are angularly displaced about the circumferences of the first and second flanges, respectively.

6. The rotor transformer positioning mechanism as recited in claim 1, further comprising a crossover cutout disposed in the second flange, wherein the crossover positioning cutout and the crossover cutout are angularly displaced about the circumferences of the first and second flanges, respectively.

7. A rotating machine, comprising:

a rotary transformer including a rotor transformer having a spool on which a first coil is wound; and a rotor stack including a second coil having power leads energized by the first coil via a crossover, wherein:

the rotor transformer further comprises first and second flanges connected to respective ends of the spool;

the rotor transformer and the rotor stack are coupled to a common rotating shaft;

the first flange is disposed proximate to the rotor stack;

the first flange includes a crossover cutout located in the periphery of the first flange, which receives the crossover;

the second flange includes a crossover positioning cutout located in the periphery of the second flange; and when the crossover positioning cutout is rotated to a first position relative to the power leads of the second coil, the crossover cutout is positioned at a second predetermined position permitting installation of the crossover.

8. The rotating machine as recited in claim 7, wherein the length of the crossover positioning cutout is greater than the thickness of the second flange.

9. The rotating machine as recited in claim 7, wherein the length of the crossover cutout is greater than the thickness of the first flange.

10. The rotating machine as recited in claim 7, wherein:

the first and second flanges are parallel to one another; and the separation between the crossover positioning cutout and the crossover cutout is greater than the distance between the first and second flanges.

11. The rotating machine as recited in claim 7, wherein the crossover positioning cutout and the crossover cutout are inclined relative to a line parallel to the rotation axis of the rotor transformer so as to minimize magnetic flux perturbations in the vicinity of the crossover positioning and crossover cutouts.

12. The rotating machine as recited in claim 7, wherein the crossover positioning cutout and the crossover cutout are angularly displaced relative to one another about the rotation axis of the rotor transformer so as to minimize magnetic flux perturbations in the vicinity of the crossover positioning and crossover cutouts.

13. The rotating machine as recited in claim 7, wherein the rotating machine comprises a resolver.

14. A method for assembling a rotating machine including a rotary transformer including a rotor transformer having a spool on which a first coil is wound, and a rotor stack including a second coil having power leads energized by the first coil via a crossover, the rotor transformer having first and second flanges connected to respective ends of the spool, the rotor transformer and the rotor stack being coupled to a common rotating shaft, the first flange being disposed proximate to the rotor stack, wherein the first flange includes a crossover cutout located in the periphery of the first flange, which receives the crossover, and the second flange includes a crossover positioning cutout located in the periphery of the second flange, comprising:

providing a jig including a pawl;

engaging the jig with the rotor transformer at the crossover positioning cutout;

rotating the jig to a predetermined position to thereby rotate the crossover positioning cutout to a first position relative to the power leads of the second coil, the first position automatically positioning the crossover cutout to a second position relative to the power leads of the second coil; and installing the crossover.

15. The method as recited in claim 14, wherein:

the length of the crossover positioning cutout is greater than the thickness of the second flange; and the method further comprising the step of attaching the rotor transformer to the rotating shaft.

16. The method as recited in claim 15, wherein the attaching step is performed after the installing step.

17. The method as recited in claim 14, wherein:

the length of the crossover cutout is greater than the thickness of the first flange, and the method further comprising the step of attaching the rotor transformer to the rotating shaft.

18. The method as recited in claim 14, wherein:

the first and second flanges are parallel to one another;

the separation between the crossover positioning cutout and the crossover cutout is greater than the distance between the first and second flanges; and the method further comprising the step of attaching the rotor transformer to the rotating shaft.

19. The method as recited in claim 14, wherein:

the crossover positioning cutout and the crossover cutout are inclined relative to a line parallel to the rotation axis of the rotor transformer so as to minimize magnetic flux perturbations in the vicinity of the crossover positioning and crossover cutouts; and the method further comprising the step of attaching the rotor transformer to the rotating shaft.

20. The method as recited in claim 14, wherein:

the crossover positioning cutout and the crossover cutout are angularly displaced relative to one another about the rotation axis of the rotor transformer so as to minimize magnetic flux perturbations in the vicinity of the crossover positioning and crossover cutouts; and the method further comprising the step of attaching the rotor transformer to the rotating shaft.

* * * * *